United States Patent
Liu et al.

(10) Patent No.: US 11,802,176 B2
(45) Date of Patent: Oct. 31, 2023

(54) BIO-BASED EPOXY RESINS, COMPOSITIONS, AND METHODS THEREOF

(71) Applicant: Ingevity South Carolina, LLC, North Charleston, SC (US)

(72) Inventors: Yongning Liu, Apex, NC (US); Wumin Yu, Mt. Pleasant, SC (US); Zhigang Chen, Mt. Pleasant, SC (US)

(73) Assignee: INGEVITY SOUTH CAROLINA, LLC, North Charleston, SC (US)

( * ) Notice: Subject to any disclaimer, the term of this patent is extended or adjusted under 35 U.S.C. 154(b) by 0 days.

(21) Appl. No.: 17/085,016

(22) Filed: Oct. 30, 2020

(65) Prior Publication Data
US 2021/0139640 A1     May 13, 2021

Related U.S. Application Data

(60) Provisional application No. 62/932,600, filed on Nov. 8, 2019.

(51) Int. Cl.
*C08G 59/16* (2006.01)
*C08G 59/18* (2006.01)
*C08L 63/04* (2006.01)

(52) U.S. Cl.
CPC ....... *C08G 59/1472* (2013.01); *C08G 59/186* (2013.01); *C08L 63/04* (2013.01)

(58) Field of Classification Search
CPC .... C08L 63/04; C08G 59/186; C08G 59/1472
USPC ...................................................... 523/400
See application file for complete search history.

(56) References Cited

U.S. PATENT DOCUMENTS

| | | | |
|---|---|---|---|
| 4,088,618 | A | 5/1978 | Saltzman et al. |
| 4,116,901 | A | 9/1978 | Sekmakas et al. |
| 4,786,666 | A | 11/1988 | Cecil et al. |
| 6,673,877 | B2 | 1/2004 | Paar et al. |
| 8,709,694 | B2 | 4/2014 | Matsuoka et al. |
| 2009/0020039 | A1 | 1/2009 | Fenn et al. |
| 2011/0151369 | A1 | 6/2011 | Shibai et al. |
| 2014/0336301 | A1 | 11/2014 | Webster et al. |
| 2015/0337146 | A1 | 11/2015 | Lee et al. |
| 2016/0139526 | A1 | 5/2016 | Veregin et al. |
| 2021/0139640 | A1 | 5/2021 | Liu et al. |

FOREIGN PATENT DOCUMENTS

| | | | | |
|---|---|---|---|---|
| JP | 2011094104 A | * | 5/2011 | ............. C08G 59/20 |
| JP | 2011219550 A | * | 11/2011 | ........... C09D 163/00 |
| WO | 2019101916 A1 | | 5/2019 | |

OTHER PUBLICATIONS

Iijima et al., JP 2011-094104 A machine translation in English, May 12, 2011 (Year: 2011).*
Nakamura et al., JP 2011-219550 A machine translation in English, Nov. 4, 2011 (Year: 2011).*
International Search Report for International Application No. PCT/US20/57605, International Filing Date Oct. 28, 2020, dated Feb. 1, 2021, 2 pages.
Wikipedia "Curing (Chemistry)" Jan. 24, 2019 retrieved from <https://en.wikipedia.org/w/index.php?title=Curing_(chemistry)&oldid=879937212>entirety of document especially p. 1 para 1.
Wikipedia "Rosin" Jan. 15, 2019 retrieved from <https://en.wikipedia.org/w/index.php?title=Thermoset_polymer_matrix&oldid=854331137>entirety of document especially Figure 5.
Wikipedia "Thermoset polymer matrix" Aug. 10, 2018 retrieved from https://en.wikipedia.org/w/index.php?title=Thermoset_polymer_matrix&oldid=854331137>entirety of document especially Figure 5.
Written Opinion for International Application No. PCT/US20/57605, International Filing Date Oct. 28, 2020, dated Feb. 1, 2021, 6 pages.

* cited by examiner

*Primary Examiner* — David T Karst
(74) *Attorney, Agent, or Firm* — Bryan D. Zerhusen, Esq.; Nicholas R. Herrel, Esq.; CANTOR COLBURN LLP

(57) ABSTRACT

A bio-based epoxy resin obtained from a reaction mixture comprising a glycidyl ether component and a bio-based component comprising a fatty acid and a rosin acid, wherein the glycidyl ether component comprises at least two epoxide groups.

20 Claims, No Drawings

BIO-BASED EPOXY RESINS, COMPOSITIONS, AND METHODS THEREOF

CROSS-REFERENCE TO RELATED APPLICATIONS

This application is a U.S. non-provisional application that claims priority to U.S. Provisional Application No. 62/932,600 filed on Nov. 8, 2019, the content of which is incorporated by reference in its entirety.

BACKGROUND OF THE INVENTION

Field of the Discovery

The present disclosure relates to bio-based epoxy resins, compositions including bio-based epoxy resins, methods of preparing bio-based epoxy resins and compositions including bio-based epoxy resins.

BACKGROUND INFORMATION

This disclosure relates to epoxy resins, and in particular to bio-based epoxy resins, compositions, methods of manufacture, and uses thereof.

Epoxy resins are useful in the manufacture of articles and components for a wide range of applications, such as adhesives, coatings, laminates, castings, encapsulations and moldings. However, most conventional epoxy resins are derived from petroleum sources. With the increasing awareness of future depletion of fossil fuel reserves, as well as the desire to move toward more environmentally friendly and sustainable "green" feedstocks, use of bio-based feedstocks to develop bio-based epoxy resins has attracted increasing attention.

Bio-based feedstocks include fatty acids derived from plant-based oils including but not limited to soybean oil, canola oil, tall oil, safflower oil, linseed oil, castor oil, corn oil, sunflower oil, olive oil, sesame oil, cottonseed oil, palm-based oils, rapeseed oil, tung oil, peanut oil, jatropha oil, and combinations thereof. Other bio-based feedstocks include rosin acids including gum rosin acid, wood rosin acid, tall oil rosin acid, or a combination thereof.

Distilled tall oil (DTO) is a 100% bio-based refinery product from the by-product in pine wood pulping. DTO includes tall oil fatty acids (oleic, linoleic, palmitic, palmitoleic, stearic and others) and rosin acids (abietic, dehydroabietic, palustric, neoabietic, isopimaric and others). Attempts have been made to incorporate fatty acids or rosin acids into epoxy resins. For example, U.S. Pat. No. 6,673,877 discloses binders for aqueous corrosion protection systems from the reaction epoxide compounds, fatty acids, amines. WO 2019101916 discloses curable composition based on fatty-acid modified epoxy resins. U.S. Pat. No. 4,786,666 discloses high-solids coating compositions by reacting bisphenol A diglycidyl ether, bisphenol A and tall oil fatty acids. U.S. Pat. No. 4,116,901 discloses a low temperature curing epoxy ester by reacting bisphenol A diglycidyl ether, castor oil fatty acids, and tall oil fatty acids. U.S. Pat. No. 8,709,694 B2 discloses a rosin diol obtained from reaction of bisphenol A-epichlorohydrin monomer with rosin, which can be used as one of the components in polyurethane synthesis. U.S. Pat. No. 4,088,618 discloses rosin-modified epoxy resins obtained from reacting a bisphenol A epichlorohydrin resin with tall oil rosin.

Previous attempts have been made to incorporate fatty acids into epoxies. Using fatty acids to modify an epoxy resin may reduce mechanical strength and thermal stability. Using only rosin acid to modify an epoxy resin may lead to a brittle solid or highly viscous liquid. There accordingly remains a need in the art for bio-based epoxy resins that provide improved mechanical strength and thermal stability while, maintaining good toughness and flexibility.

SUMMARY

Presently described are bio-based epoxy resins, curable compositions including bio-based epoxy resins, and methods of their preparation and use.

Thus, in an aspect, the disclosure provides a bio-based epoxy resin obtained from a reaction mixture comprising a glycidyl ether component and a bio-based component comprising a fatty acid and a rosin acid, wherein the glycidyl ether component comprises at least two epoxide groups.

In other aspects, the disclosure provides methods of making and methods of using bio-based epoxy resins as described herein.

The preceding general areas of utility are given by way of example only and are not intended to be limiting on the scope of the present disclosure and appended claims. Additional objects and advantages associated with the compositions, methods, and processes of the present disclosure will be appreciated by one of ordinary skill in the art in light of the instant claims, description, and examples. For example, the various aspects and embodiments of the present disclosure can be utilized in numerous combinations, all of which are expressly contemplated by the present disclosure. These additional advantages objects and embodiments are expressly included within the scope of the present disclosure. The publications and other materials used herein to illuminate the background of the invention, and in particular cases, to provide additional details respecting the practice, are incorporated by reference.

DETAILED DESCRIPTION

The present disclosure will now be described more fully hereinafter, but not all embodiments of the disclosure are shown. While the disclosure has been described with reference to exemplary embodiments, it will be understood by those skilled in the art that various changes can be made and equivalents can be substituted for elements thereof without departing from the scope of the disclosure. In addition, many modifications can be made to adapt a particular structure or material to the teachings of the disclosure without departing from the essential scope thereof.

Where a range of values is provided, it is understood that each intervening value between the upper and lower limit of that range and any other stated or intervening value in that stated range is encompassed within the invention. The upper and lower limits of these smaller ranges can independently be included in the smaller ranges is also encompassed within the invention, subject to any specifically excluded limit in the stated range. Where the stated range includes one or both of the limits, ranges excluding either both of those included limits are also included in the present disclosure.

The following terms are used to describe the present invention. In instances where a term is not specifically defined herein, that term is given an art-recognized meaning by those of ordinary skill applying that term in context to its use in describing the present invention.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the 10 United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. It should also be understood that, unless clearly indicated to the contrary, in any methods claimed herein that include more than one step or act, the order of the steps or acts of the method is not necessarily limited to the order in which the steps or acts of the method are recited.

EXEMPLARY ASPECTS AND EMBODIMENTS

Surprisingly and unexpectedly, the inventors found that the reaction product obtained from the reaction of a glycidyl ether component and a bio-based component comprising a fatty acid and a rosin acid, wherein the glycidyl ether component comprises at least two epoxide groups has a balance of properties including mechanical strength, thermal stability, toughness, and flexibility. The disclosed compositions and methods relate to bio-based epoxy resin, curable compositions including the bio-based epoxy resin; methods for preparing the bio-based epoxy resin; and methods for preparing curable compositions including the bio-based epoxy resin.

As described above, conventional epoxy resins and epoxy resin compositions are derived from petroleum sources. It would be an advantage to incorporate bio-based feedstocks such as bio-based fatty acids and bio-based rosin acids into epoxy resins to provide more environmentally-friendly epoxy resins. It would be a further advantage if the desirable properties associated with epoxy resins were maintained or improved.

In any of the aspects or embodiments described herein, a bio-based epoxy resin obtained from a reaction mixture comprises a glycidyl ether component and a bio-based component comprising a fatty acid and a rosin acid, wherein the glycidyl ether component comprises at least two epoxide groups.

The bio-based component includes fatty acids and rosin acids. The fatty acid can be derived from at least one soybean oil, canola oil, tall oil, safflower oil, linseed oil, castor oil, corn oil, sunflower oil, olive oil, sesame oil, cottonseed oil, palm-based oils, rapeseed oil, tung oil, peanut oil, jatropha oil, or a combination thereof. The rosin acid can include at least one gum rosin acid, wood rosin acid, tall oil rosin acid, or a combination thereof.

The bio-based epoxy resins of the present disclosure have an acid number less than or equal to about 5, or about 4, or about 3, or about 2, or about 1 mg KOH/g as determined according to ASTM D664; an epoxide equivalent weight of 200 to 800; or 400 to 800, g/eq, or a combination thereof.

The bio-based component can be distilled tall oil (DTO). DTO is a mixture of rosin acids and tall oil fatty acids (TOFA). DTO rosin acids include $C_{20}$ mono-carboxylic acids with a core having a fused carbocyclic ring system comprising double bonds that vary in number and location. Examples of rosin acids include abietic acid, neoabietic acid, pimaric acid, levopimaric acid, sandaracopimaric acid, isopimaric acid, and palustric acid. TOFAs can have a range of chain lengths. In some embodiments, the TOFAs range from C-16 to C-29. DTO can further contain dimerized rosin acids and dehydroabietic acids formed during the Kraft process and distillation of crude tall oil (CTO). In some embodiments, DTO includes fatty acid derivatives and/or rosin acid derivatives. Rosin acid derivatives can include hydrogenated rosins, disproportionated rosins, maleic anhydride modified rosins, fumaric acid modified rosins, and the like. Fatty acid derivatives can include dimer fatty acids (e.g., DTC-1500 from INGEVITY) and/or acid-modified fatty acids, such as acrylic acid modified fatty acids (e.g., DIACID 1550 from INGEVITY) and maleic anhydride modified fatty acids (e.g., TENAX 2010 from INGEVITY).

Bio-based components, which include fatty acids and rosin acids, can have a variable rosin acid content. The bio-based components include 1-99 wt %, or 30-80 wt % fatty acids and 1-99 wt %, or 20-70 wt % rosin acids. The bio-based components present in the reaction mixture to obtain bio-based epoxy resin can have from about 1 wt % to about 99 wt %, about 5 wt % to about 95 wt %, about 10 wt % to about 90 wt %, about 15 wt % to about 80 wt %, about 20 wt % to about 70 wt %, about 20 wt % to about 50 wt %, about 20 wt % to about 30 wt %, about 20 wt % to about 28 wt %, 28 wt % to about 70 wt %, or about 28 wt % to about 50 wt %, each based on the total weight of bio-based component. The bio-based component can be a distilled tall oil. Commercially available DTOs with variable rosin acid content include ALTAPYNE 226 (20 wt % rosin acid), ALTAPYNE 28B (28 wt % rosin acid), ALTAPYNE M50 (50 wt % rosin acid), and ALTAPYNE M70 (70 wt % rosin acid), all from INGEVITY.

A glycidyl ether component is present in the reaction mixture for obtaining a bio-based epoxy resin. The glycidyl ether component can include glycidyl ether resin, a glycidyl ether compound, or a combination thereof. As used herein, a "glycidyl ether resin" is an oligomer or a polymer including a glycidyl ether compound and a "glycidyl ether compound" is a monomer. Examples of glycidyl ether compounds include bisphenol A diglycidyl ether. The glycidyl ether component comprises at least two epoxide groups. As such, the glycidyl ether component can be a diglycidyl ether, a triglycidyl ether, a tetraglycidyl ether, and the like.

The glycidyl ether component can include a bisphenol epoxy resin, a novolac epoxy resin, a diglycidyl ether, triglycidyl ether, tetraglycidyl ether, or a combination thereof. Bisphenol epoxy resins can be obtained from the reaction of a bisphenol with epichlorohydrin. The bisphenol epoxy resins can include bisphenol A epoxy resin, bisphenol F epoxy resin, or a combination thereof. The bisphenol epoxy resins can be liquid epoxy resins and have an epoxide equivalent weight of about 150 to about 200, or about 160 to about 200, or about 170 to about 200, or about 180 to about 200 grams per equivalent as determined according to ASTM D1652. A preferred bisphenol epoxy resin is bisphenol A epoxy resin, commercially available as EPON 828; from Hexion, having an epoxide equivalent weight of about 185 to about 192 grams per equivalent.

Novolac epoxy resins are the reaction products of a phenolic compound such as phenol, o-, m-, or p-cresol, or a combination of these with an aldehyde, such as formaldehyde, benzaldehyde, acetaldehyde, and the like. For example, the novolac epoxy resin can be a phenol-formaldehyde copolymer, wherein the phenolic ring is substituted with a glycidyl ether group. The novolac epoxy can have an average epoxy functionality of from about 2 to about 6, from about 3 to about 6, from about 3 to about 5, or from about 3 to about 4. Such resins also have an epoxide equivalent weight as measured by ASTM D 1652 of about 150 to about 200, or about 160 to about 190, or about 170 to about 190, or about 170 to about 185 grams per equivalent. A preferred novolac epoxy resin is D.E.N. 438, from Olin, having an epoxide equivalent weight of about 176 to about 181 grams per equivalent.

In some embodiments, the glycidyl ether component includes a glycidyl ether compound such as a diglycidyl ether, triglycidyl ether, tetraglycidyl ether, or a combination thereof. Non-limiting examples of the diglycidyl ethers include a diglycidyl ether of neopentyl glycol, a diglycidyl ether of 1,4-butanediol, and a diglycidyl ether of resorcinol. The triglycidyl ether can include trimethylolpropane triglycidyl ether and the tetraglycidyl ether can include pentaerythritol tetraglycidyl ether.

In some embodiments, the bio-based epoxy resin includes bisphenol A epoxy resin as the glycidyl ether component, and the bio-based component is a distilled tall oil comprising up to about 50 wt %, from about 20 wt % to about 50 wt %, about 20 wt % to about 30 wt %, about 20 wt % to about 28 wt %, or about 28 wt % to about 50 wt % rosin acids, each based on the total weight of the distilled tall oil. When the glycidyl ether component includes novolac epoxy resin, lower rosin acid content bio-based components are preferred due to the increase in viscosity that results with higher rosin content.

In some embodiments, the bio-based epoxy resin includes a mixture of bisphenol A epoxy resin and novolac epoxy resin as the glycidyl ether component, and the bio-based component is a distilled tall oil comprising up to about 50 wt %, about 20 wt % to about 50 wt %, about 20 wt % to about 30 wt %, about 20 wt % to about 28 wt %, or about 28 wt % to about 50 wt % rosin acids, based on the total weight of the distilled tall oil. Rosin content higher than about 50 wt % results in a highly viscous mixture that is not practically useful.

In other embodiments, the bio-based epoxy resin includes mixture of a triglycidyl ether and novolac epoxy resin as the glycidyl ether component, and the bio-based component is a distilled tall oil comprising up to about 50 wt %, about 20 wt % to about 50 wt %, about 20 wt % to about 30 wt %, about 20 wt % to about 28 wt %, or about 28 wt % to about 50 wt % rosin acids, based on the total weight of the distilled tall oil.

In still other embodiments, the glycidyl ether component is trimethylolpropane triglycidyl ether, wherein the bio-based component is a distilled tall oil comprising about 50 wt % to about 70 wt % rosin acids, based on the total weight of the distilled tall oil.

The bio-based epoxy resin can have a bio-content. The bio-content is the wt % of the total of the bio-based component. The bio-content is from about 20 to about 60 wt %, about 25 to about 60 wt %, about 30 wt % to about 60 wt %, about 40 wt % to about 60 wt %, about 50 wt % to about 60 wt %, about 20 wt % to about 50 wt %, about 25 wt % to about 50 wt %, about 30 wt % to about 50 wt %, or about 40 wt % to about 50 wt %, based on the total weight of the bio-based epoxy resin.

Methods for preparing a bio-based epoxy resin include the steps of
a. admixing a glycidyl ether component and a bio-based component to form a reaction mixture;
b. heating the reaction mixture;
c. adding a catalyst to the reaction mixture; and
d. allowing the reaction to proceed until the reaction mixture has an acid number of less than or equal to about 5 mg KOH/g, preferably about 1 mg KOH/g, according to ASTM D664.

The reaction temperature can range from about 80 to about 160° C., or about 100 to about 150° C., preferably from about 125 to about 145° C.

Curable compositions including bio-based epoxy resin obtained from a reaction mixture comprising a glycidyl ether component and a bio-based component comprising a fatty acid and a rosin acid, wherein the glycidyl ether component comprises at least two epoxide groups; and an auxiliary epoxy resin. The auxiliary epoxy resin can be the same or different from the bisphenol epoxy resin of the glycidyl ether component. The auxiliary epoxy resin can be any epoxy resin known in the art. In some embodiments, the auxiliary epoxy resin includes a bisphenol epoxy resin, a novolac epoxy resin, or a combination thereof. The ratio of bio-based epoxy resin to auxiliary epoxy resin in the curable compositions can range from about 20:80 to about 80:20, about 25:75 to about 75:25, about 30:70 to about 70:30, about 35:65 to about 65:35, about 40:60 to about 60:40, about 45:55 to about 55:45, or can be about 50:50.

In some embodiments, the curable composition includes bisphenol A epoxy resin as the glycidyl ether component, and the bio-based component is a distilled tall oil comprising up to 50 wt %, from about 20 wt % to about 50 wt %, about 20 wt % to about 30 wt %, about 20 wt % to about 28 wt %, or about 28 wt % to about 50 wt % rosin acids, based on the total weight of the bio-based component.

In other embodiments, the curable composition includes a mixture of bisphenol A epoxy resin and a novolac epoxy resin as the glycidyl ether component, and the distilled tall oil comprises up to about 50 wt %, about 20 wt % to about 50 wt %, about 20 wt % to about 30 wt %, about 20 wt % to about 28 wt %, or about 28 wt % to about 50 wt % rosin acids, based on the total weight of the distilled tall oil.

In other embodiments, the curable composition includes a mixture of triglycidyl ether and novolac epoxy resin as the glycidyl ether component, and the distilled tall oil comprises up to 50 wt %, about 20 wt % to about 50 wt %, about 20 wt % to about 30 wt %, about 20 wt % to about 28 wt %, or about 28 wt % to about 50 wt % rosin acids, based on the total weight of the distilled tall oil.

In still other embodiments, the glycidyl ether component is trimethylolpropane triglycidyl ether, and the bio-based component is a distilled tall oil comprising about 50 wt % to about 70 wt % rosin acids, based on the total weight of the distilled tall oil.

The curable compositions can further comprise an additive, wherein the additive is a flow control agent, dry flow agent, antioxidant, pigment, dye, optical brightener, extender, heat stabilizer, light stabilizer, ultraviolet light stabilizer, ultraviolet light-absorbing compound, near infrared light-absorbing compound, infrared light-absorbing compound, plasticizer, lubricant, antistatic agent, anti-fog agent, antimicrobial agent, radiation stabilizer, flame retardant, anti-drip agent, fragrance, or a combination thereof. Any additive is used in an amount generally known to be effective, which can be from 0.001 to 10 parts by weight, per 100 parts by weight of the total amount of epoxy resin in the curable composition For example, the total amount of the additives (other than any filler or pigment) can be 0.01 to 20 parts by weight, or 1 to 10 parts by weight, per 100 parts by weight of the total amount of epoxy resin in the curable composition.

The curable compositions have a bio-content. The bio-content as used herein, refers to the weight of the bio-based component divided by the total weight of the composition. The bio-content can range from about 5 to about 40%, about 10 to about 35%. about 10 to about 30%, about 20 to about 40%, about 20 to about 35%, or about 20 to about 30%.

Methods for preparing the curable compositions include the steps of
  a. admixing a glycidyl ether component and a bio-based component to form a reaction mixture;
  b. heating the reaction mixture;
  c. adding a catalyst to the reaction mixture;
  d. allowing the reaction to proceed until the reaction mixture has an acid number of less than or equal to about 1 mg KOH/g according to ASTM D664;
  e. adding the reaction mixture from step (d) to the auxiliary epoxy resin to form a mixture;
  f. adding a curing agent to the mixture from step (e).

The term "curing agent" as used herein encompasses compounds whose roles in curing epoxy compounds are variously described as those of a hardener, a hardening accelerator, a crosslinking agent, a curing catalyst, a curing co-catalyst, and a curing initiator, among others. Curing agents can have active hydrogen atoms that react with epoxy groups of the epoxy resin to form an extended or cross-linked resin. The active hydrogen atoms can be present in functional groups comprising primary or secondary amines, phenols, thiols, carboxylic acids, or carboxylic acid anhydrides. Curing agents can also function as an initiator for epoxy resin polymerization or as an accelerator for other curing agents.

Curing agents can include imidazole, amines, organophosphine, urea derivatives, Lewis bases, and their organic salts. The term "curing agent" as used herein encompasses compounds whose roles in curing epoxy compounds are variously described as those of a hardener, a hardening accelerator, a crosslinking agent, a curing catalyst, a curing co-catalyst, and a curing initiator, among others. Curing agents can have active hydrogen atoms that react with epoxy groups of the epoxy resin to form an extended or cross-linked resin. The active hydrogen atoms can be present in functional groups comprising primary or secondary amines, phenols, thiols, carboxylic acids, or carboxylic acid anhydrides. Curing agents can also function as an initiator for epoxy resin polymerization or as an accelerator for other curing agents.

The cured compositions of the present disclosure are useful for coatings, adhesives, composites, electronic encapsulations, and electrical potting materials.

The details of the examples are contemplated as further embodiments of the described methods and compositions. Therefore, the details as set forth herein are hereby incorporated into the detailed description as alternative embodiments.

EXAMPLES

Synthesis Example 1

398 g of DTO M-50B (trade name: ALTAPYNE M-50B; from Ingevity; containing about 50% rosin acids and 50% tall oil fatty acids) and 364 g of trimethylolpropane triglycidyl ether (technical grade; from Sigma) are charged into a reaction vessel equipped with temperature probe, nitrogen inlet and mechanical stirrer. The reaction mixture is heated to 100° C. and then 1.6 g of triphenyl phosphine is charged. After the exothermic peak, the reaction mixture is cooled down to 125° C. and maintained at that temperature until an acid number≤1 is reached. The reaction product is a viscous amber liquid with an EEW value of 623. The bio-content of this DTO-epoxy resin is about 52%.

Synthesis Example 2

366 g of DTO M-50B (trade name: ALTAPYNE M-50B; from Ingevity; containing about 50% rosin acids and 50% tall oil fatty acids) and 415 g of bisphenol A diglycidyl ether (trade name: EPON 828; from Hexion) are charged into a reaction vessel equipped with temperature probe, nitrogen inlet and mechanical stirrer. The reaction mixture is heated to 100° C. and then 1.4 g of triphenyl phosphine (from Sigma) is charged. After the exothermic peak, the reaction mixture is cooled down to 125° C. and maintained at that temperature until an acid number≤1 is reached. The reaction product is a viscous amber liquid with an EEW value of 690. The bio-content of this DTO-epoxy resin is about 47%.

Synthesis Example 3

366 g of DTO M-28B (trade name: ALTAPYNE M-28B; from Ingevity; containing about 28% rosin acids and 78% tall oil fatty acids) and 463 g of bisphenol A diglycidyl ether (trade name: EPON 828; from Hexion) are charged into a reaction vessel equipped with temperature probe, nitrogen inlet and mechanical stirrer. The reaction mixture is heated to 100° C. and then 1.4 g of triphenyl phosphine (from Sigma) is charged. After the exothermic peak, the reaction mixture is cooled down to 125° C. and maintained at that temperature until an acid number≤1 is reached. The reaction product is a viscous amber liquid with an EEW value of 666. The bio-content of this DTO-epoxy resin is about 44%.

Synthesis Example 4

366 g of DTO M-28B (trade name: ALTAPYNE M-28B; from Ingevity; containing about 28% rosin acids and 78% tall oil fatty acids), 225 g of trimethylolpropane triglycidyl ether (technical grade; from Sigma) and 280 g of Epoxy Novolac Resin (trade name: D.E.N. 438; from Olin) are charged into a reaction vessel equipped with temperature probe, nitrogen inlet and mechanical stirrer. The reaction mixture is heated to 100° C. and then 1.4 g of triphenyl phosphine (from Sigma) is charged. After the exothermic peak, the reaction mixture is cooled down to 125° C. and maintained at that temperature until an acid number≤1 is reached. The reaction product is a viscous amber liquid with an EEW value of 463. The bio-content of this DTO-epoxy resin is about 41%.

Synthesis Example 5

337 g of DTO M-28B (trade name: ALTAPYNE M-28B; from Ingevity; containing about 28% rosin acids and 78% tall oil fatty acids), 258 g of Epoxy Novolac Resin (trade name: DEN 438; from Olin) and 258 g of bisphenol A diglycidyl ether (trade name: EPON 828; from Hexion) are charged into a reaction vessel equipped with temperature probe, nitrogen inlet and mechanical stirrer. The reaction mixture is heated to 100° C. and then 1.3 g of triphenyl phosphine (from Sigma) is charged. After the exothermic peak, the reaction mixture is cooled down to 125° C. and maintained at that temperature until an acid number≤1 is reached. The reaction product is a viscous amber liquid with an EEW value of 502. The bio-content of this DTO-epoxy resin is about 42%.

Example 6

A simple model formula was used to evaluate the performance of the DTO-epoxy resins synthesized above and EPON 828 was used as the control. In this formula, the DTO-epoxy resins were first mixed with EPON 828 in different ratios, and then mixed with a curing agent (Jeffamine T403) in a 1:1 equivalent ratio, together with 5 wt % (on the total weight of epoxy and curing agent) of 2,4,6-Tris-(dimethylaminomethyl)phenol (DMP-30) as an accelerator (catalyst).

In a curing behavior study, 150 g of the above mixture in a plastic cup was placed in a 50° C. water bath and the viscosity, gel time, time from gel to exothermic peak temperature and peak temperature were recorded. The viscosity of the mixture was measured with a Brookfield viscometer (model CAP 2000+) at 50° C. and 50 rpm with a #3 spindle. The above mixture was also poured into the silicon molds to cure at room temperature overnight and then post-cure at 100° C. for 2 hours to prepare specimens for tensile test and dynamic mechanical analysis (DMA). The model formula for coating properties study was prepared by mixing 80 parts of the above mixture with 20 parts of methyl ethyl ketone (MEK). Standard test panels were made by applying the epoxy coatings to Leneta cards and aluminum panels using a drawdown bar. The coatings on test panels were cured for 7 days at room temperature (25° C.) before the coating property characterization. ASTM methods were used for sample characterization where applicable. The dry time was recorded with a GARDCO DT-5040 quadracycle electronic dry time recorder (ASTM D5895).

The methyl ethyl ketone (MEK) double rub test was conducted with a ball-peen hammer (ASTM D5402).

The gloss of the coated films was measured with a BYK gloss meter.

The pencil hardness test was conducted with a BYK pencil hardness tester according to ASTM D3363.

The mandrel bend test was conducted with a TQC mandrel bend tester (ASTM D522).

The adhesion of the coatings to aluminum was measured with the cross-hatch tape test method (ASTM D3359). The water absorption test was conducted by immersing the samples in water at room temperature and measure the weight gain of each sample at 3 days and 7 days. The chemical resistance of the coatings was evaluated with a spot test method by placing a drop of each of the chemicals on the coating surface and evaluating the damage to the contact area after 24 hours in contact. The damage was rated in 1 to 5 scale (5: no damage; 4: slight damage; 3: moderate damage; 2: considerable damage; 1: Very strong damage). The properties of the samples were listed in Tables 1 and 2.

TABLE 1

| Properties of 50/50 mixtures of EPON 828/DTO Epoxy | | | | | | |
|---|---|---|---|---|---|---|
| Example No. | Control | 1 | 2 | 3 | 4 | 5 |
| DTO-epoxy | | Synthesis Example 1 | Synthesis Example 2 | Synthesis Example 3 | Synthesis Example 4 | Synthesis Example 5 |
| Mix ratio of Epon828/DTO epoxy | 100/0 | 50/50 | 50/50 | 50/50 | 50/50 | 50/50 |
| Bio-content, % | 0 | 26 | 24 | 22 | 21 | 20 |
| Process Properties | | | | | | |
| Initial viscosity @50, cps | 60 | 210 | 530 | 310 | 270 | 420 |

TABLE 1-continued

Properties of 50/50 mixtures of EPON 828/DTO Epoxy

| Example No. | Control | 1 | 2 | 3 | 4 | 5 |
|---|---|---|---|---|---|---|
| Gel time @50 C., min | 54 | 34 | 27 | 31 | 30 | 30 |
| Cure Time @50 C., min | 9 | 12 | 10 | 11 | 13 | 14 |
| Exothermic peak temperature, °C. | 154 | 130 | 129 | 122 | 141 | 126 |

Thermal and Physical properties

| | | | | | | |
|---|---|---|---|---|---|---|
| Tan Delta Tg ° C. | 98 | 56 | 82 | 73 | 74 | 80 |
| Tensile strength, Mpa | 65.4 ± 4.4 | 41.8 ± 2.7 | 51.4 ± 9.8 | 49.3 ± 7.8 | 50.2 ± 3.5 | 53.7 ± 1.5 |
| Tensile modulus, Mpa | 3477.7 ± 116.4 | 2501.1 ± 113.0 | 3413.0 ± 402.9 | 2944.4 ± 80.4 | 2731.7 ± 244.9 | 2818.5 ± 85.8 |
| Elongation at break, % | 3.39 ± 0.59 | 3.92 ± 0.51 | 1.70 ± 0.17 | 2.18 ± 0.52 | 3.15 ± 0.31 | 2.86 ± 0.30 |

Coating properties (room temperature cured)

| | | | | | | |
|---|---|---|---|---|---|---|
| Circular tack free time, hr | 5.7 | 9.2 | 6.8 | 7.2 | 6.5 | 6.2 |
| 60° Gloss | 101 | 98 | 100 | 100 | 99 | 100 |
| Pencil hardness | 2H | HB | HB | HB | H | H |
| Conical mandrel bend | Pass | Pass | Fail | Pass | Pass | Pass |
| Cross hatch adhesion to Aluminum | 3B | 5B | 2B | 4B | 4B | 5B |
| MEK resistance, double rubs | 300 | 225 | 150 | 250 | 275 | 300 |

Chemical resistance (24 hours spot test, 5- no damage, 1 - strong damage)

| | | | | | | |
|---|---|---|---|---|---|---|
| Acetic acid (10%) | 1 | 1 | 1 | 1 | 1 | 1 |
| Sulfuric acid (50%) | 2 | 1 | 2 | 2 | 2 | 2 |
| Sodium hydroxide (50%) | 5 | 5 | 5 | 5 | 5 | 5 |
| Ammonium hydroxide (10%) | 5 | 5 | 5 | 5 | 5 | 5 |
| Xylene | 5 | 5 | 5 | 5 | 5 | 5 |

Water Absorption (%)

| | | | | | | |
|---|---|---|---|---|---|---|
| 25° C./3 days | 0.45 | 2.38 | 0.94 | 1.06 | 1.5 | 0.89 |
| 25° C./7 days | 0.73 | 3.8 | 1.45 | 1.73 | 2.3 | 1.47 |

TABLE 2

Properties of 75/25 - 25/75 mixtures of EPON 828/DTO Epoxy

| Example No. | Control | 6 | 2 | 7 | 4 | 8 | 9 | 5 | 10 |
|---|---|---|---|---|---|---|---|---|---|
| DTO epoxy | | Synthesis Example 3 | | Synthesis Example 4 | | | Synthesis Example 5 | | |
| Ratio of EPON828/DTO epoxy | 100/0 | 75/25 | 50/50 | 75/25 | 50/50 | 25/75 | 75/25 | 50/50 | 25/75 |
| Bio-content, (%) | 0 | 12 | 24 | 11 | 21 | 32 | 10 | 20 | 30 |

Process Properties

| | | | | | | | | | |
|---|---|---|---|---|---|---|---|---|---|
| Initial Mix viscosity | 60 | 350 | 530 | 150 | 270 | 480 | 180 | 420 | 780 |

TABLE 2-continued

Properties of 75/25 - 25/75 mixtures of EPON 828/DTO Epoxy

| Example No. | Control | 6 | 2 | 7 | 4 | 8 | 9 | 5 | 10 |
|---|---|---|---|---|---|---|---|---|---|
| @50 C., cps | | | | | | | | | |
| Gel time @50 C., min | 54 | 37 | 27 | 31 | 30 | 28 | 37 | 30 | 27 |
| Cure time @50 C., min | 9 | 13 | 10 | 11 | 13 | 16 | 12 | 14 | 15 |
| Exothermic peak temp, °C. | 154 | 152 | 129 | 122 | 141 | 109 | 160 | 126 | 108 |
| Thermal and Physical Properties | | | | | | | | | |
| Tan Delta Tg° C. | 98 | 91 | 82 | 73 | 74 | too soft | 95 | 80 | 69 |
| Tensile strength, Mpa | 65.4 ± 4.4 | 59.9 ± 10.1 | 51.4 ± 9.8 | 58.4 ± 4.6 | 50.2 ± 3.5 | 16.0 ± 0.7 | 60.2 ± 2.1 | 53.7 ± 1.5 | 40.1 ± 2.6 |
| Tensile modulus, Mpa | 3477.7 ± 116.4 | 3304.0 ± 117.9 | 3413.0 ± 402.9 | 3213.6 ± 380.9 | 2731.7 ± 244.9 | 906.6 ± 66.8 | 3217.4 ± 124.0 | 2818.5 ± 85.8 | 2212.4 ± 189.9 |
| Elongation at break, % | 3.39 ± 0.59 | 3.04 ± 0.57 | 1.70 ± 0.17 | 3.61 ± 0.31 | 3.15 ± 0.31 | 16.12 ± 3.56 | 2.80 ± 0.25 | 2.86 ± 0.30 | 2.97 ± 0.30 |
| Coating properties | | | | | | | | | |
| Circular Tack-free time, min | 5.7 | 5.9 | 6.8 | 6.0 | 6.5 | 7.5 | 5.7 | 6.2 | 7.0 |
| 60° Gloss | 101 | 100 | 100 | 100 | 99 | 97 | 100 | 100 | 99 |
| Pencil hardness | 2H | H | HB | H | H | 3B | H | H | HB |
| Conical Mandrel mixture | pass | fail | fail | pass | pass | pass | pass | pass | pass |
| Cross hatch adhesion to aluminum | 3B | 2B | 2B | 3B | 4B | 4B | 5B | 5B | 5B |
| MEK resistance, double rubs | 300 | 300 | 150 | >400 | 275 | 125 | 325 | 300 | 150 |
| Chemical resistance | | | | | | | | | |
| Acetic acid (10%) | 1 | 1 | 1 | 1 | 1 | 1 | 1 | 1 | 1 |
| Sulfuric acid (50%) | 2 | 2 | 2 | 2 | 2 | 1 | 2 | 2 | 2 |
| Sodium hydroxide (50%) | 5 | 5 | 5 | 5 | 5 | 5 | 5 | 5 | 5 |
| Ammonium hydroxide (10%) | 5 | 5 | 5 | 5 | 5 | 5 | 5 | 5 | 5 |
| Xylene | 5 | 5 | 5 | 5 | 5 | 5 | 5 | 5 | 5 |
| Water Absorption (%) | | | | | | | | | |
| 25° C./3 days | 0.45 | 0.42 | 0.94 | 0.97 | 1.5 | 3.45 | 0.48 | 0.89 | 1.08 |
| 25° C./7 days | 0.73 | 0.65 | 1.45 | 1.5 | 2.2 | 5.34 | 0.82 | 1.47 | 1.66 |

EXEMPLARY EMBODIMENTS

In any aspect or embodiment described herein, a bio-based epoxy resin is obtained from a reaction mixture comprising a glycidyl ether component and a bio-based component comprising a fatty acid and a rosin acid, wherein the glycidyl ether component comprises at least two epoxide groups.

In any aspect or embodiment described herein, the bio-based epoxy resin comprises a fatty acid derived from at least one soybean oil, canola oil, tall oil, safflower oil, linseed oil, castor oil, corn oil, sunflower oil, olive oil, sesame oil, cottonseed oil, palm-based oils, rapeseed oil, tung oil, peanut oil, jatropha oil, or a combination thereof; and a rosin acid comprising at least one gum rosin acid, wood rosin acid, tall oil rosin acid, or a combination thereof; and the bio-based epoxy resin has an acid number of less than or equal to about 5 milligrams of KOH per gram according to ASTM D664; an epoxide equivalent weight of about 200 to about 800 grams per equivalent; or a combination thereof.

In any aspect or embodiment described herein, the glycidyl ether component comprises a bisphenol epoxy resin, a novolac epoxy resin, a diglycidyl ether, triglycidyl ether, tetraglycidyl ether, or a combination thereof.

In any aspect or embodiment described herein, the bisphenol epoxy resin comprises bisphenol A epoxy resin, bisphenol F epoxy resin, or a combination thereof.

In any aspect or embodiment described herein, the diglycidyl ether comprises a diglycidyl ether of neopentyl glycol, a diglycidyl ether of 1,4-butanediol, or diglycidyl ether of resorcinol; the triglycidyl ether comprises trimethylolpropane triglycidyl ether; and the tetraglycidyl ether comprises pentaerythritol tetraglycidyl ether.

In any aspect or embodiment described herein, the novolac epoxy resin comprises epoxy phenol novolac, epoxy cresol novolac, or a combination thereof, and wherein the novolac epoxy resin has an epoxy functionality of 3-6.

In any aspect or embodiment described herein, the bio-based component further comprises fatty acid derivatives, rosin acid derivatives, or a combination thereof.

In any aspect or embodiment described herein, the fatty acid derivatives comprise dimer fatty acids, acrylic acid modified fatty acids, maleic anhydride modified fatty acids, or a combination thereof.

In any aspect or embodiment described herein, the rosin acid derivatives comprise hydrogenated rosins, disproportionated rosins, maleic anhydride modified rosins, fumaric acid modified rosins, or a combination thereof.

In any aspect or embodiment described herein, the bio-based component comprises 1-99 wt % of fatty acids; and 1-99 wt % of rosin acids.

In any aspect or embodiment described herein, a molar ratio of the glycidyl ether to the bio-based component is about 0.5:1 to about 1.5:1, or about 0.9:1 to about 1.1:1.

In any aspect or embodiment described herein, the glycidyl ether component is bisphenol A epoxy resin, and the bio-based component is a distilled tall oil comprising up to about 50 wt % rosin acids, based on the total weight of the distilled tall oil.

In any aspect or embodiment described herein, the glycidyl ether component is a bisphenol A epoxy resin and a novolac epoxy resin, and the bio-based component is a distilled tall oil comprising up to about 50 wt % rosin acids, based on the total weight of the distilled tall oil.

In any aspect or embodiment described herein, the glycidyl ether component is triglycidyl ether and novolac epoxy resin, and the bio-based component is a distilled tall oil comprising up to about 50 wt % rosin acids, based on the total weight of the distilled tall oil.

In any aspect or embodiment described herein, the glycidyl ether component is trimethylolpropane triglycidyl ether, and bio-based component is a distilled tall oil comprising from about 50 wt % to about 70 wt % rosin acid, based on the total weight of the distilled tall oil.

In any aspect or embodiment described herein, curable composition comprises: a bio-based epoxy resin obtained from a reaction mixture comprising a glycidyl ether component and a bio-based component comprising a fatty acid and a rosin acid, wherein the glycidyl ether component comprises at least two epoxide groups; and an auxiliary epoxy resin.

In any aspect or embodiment described herein, a ratio of bio-based epoxy resin to auxiliary epoxy resin is about 10:90 to about 90:10, about 25:75 to about 75:25, or about 50:50.

In any aspect or embodiment described herein, the glycidyl ether component is bisphenol A epoxy resin, and the bio-based component is a distilled tall oil comprising up to about 50 wt % rosin acids; or the glycidyl ether component is a mixture of bisphenol A epoxy resin and a novolac epoxy resin, and the bio-based component is a distilled tall oil comprising up to about 50 wt % rosin acids; or the glycidyl ether component is a mixture of triglycidyl ether and novolac epoxy resin, and the bio-based component is a distilled tall oil comprising up to about 50 wt % rosin acids, each based on the total weight of the distilled tall oil.

In any aspect or embodiment described herein, a method of preparing the bio-based epoxy resin comprises the steps of
  a. admixing a glycidyl ether component and a bio-based component to form a reaction mixture;
  b. heating the reaction mixture;
  c. adding a catalyst to the reaction mixture; and
  d. allowing reaction to proceed until the reaction mixture has an acid number of less than or equal to about 1 mg KOH/g according to ASTM D664.

A method of preparing the curable composition comprising the steps of
  a. admixing a glycidyl ether component and a bio-based component to form a reaction mixture;
  b. heating the reaction mixture;
  c. adding a catalyst to the reaction mixture;
  d. allowing the reaction to proceed until the reaction mixture has an acid number of less than or equal to about 1 mg KOH/g according to ASTM D664;
  e. adding the reaction mixture from step (d) to an auxiliary epoxy resin to form a mixture;
  f. adding a curing agent to the mixture from step (e).

While several embodiments of the invention have been shown and described herein, it will be understood that such embodiments are provided by way of example only. Numerous variations, changes and substitutions will occur to those skilled in the art without departing from the spirit of the invention. Rather, the present disclosure is to cover all modifications, equivalents, and alternatives falling within the scope of the present disclosure as defined by the following appended claims and their legal equivalents. Accordingly, it is intended that the description and appended claims cover all such variations as fall within the spirit and scope of the invention.

The contents of all references, patents, pending patent applications and published patents, cited throughout this application are hereby expressly incorporated by reference.

Those skilled in the art will recognize, or be able to ascertain using no more than routine experimentation, many equivalents to the specific embodiments of the invention described herein. Such equivalents are intended to be encompassed by the following claims. It is understood that the detailed examples and embodiments described herein are given by way of example for illustrative purposes only, and are in no way considered to be limiting to the invention. Various modifications or changes in light thereof will be suggested to persons skilled in the art and are included within the spirit and purview of this application and are considered within the scope of the appended claims. For example, the relative quantities of the ingredients can be varied to optimize the desired effects, additional ingredients can be added, and/or similar ingredients can be substituted for one or more of the ingredients described. Additional advantageous features and functionalities associated with the systems, methods, and processes of the present invention will be apparent from the appended claims. Moreover, those skilled in the art will recognize, or be able to ascertain using no more than routine experimentation, many equivalents to the specific embodiments of the invention described herein. Such equivalents are intended to be encompassed by the following claims.

What is claimed is:

1. A curable composition comprising a functionalized oligomer epoxy resin and an auxiliary epoxy resin at a ratio of functionalized oligomer epoxy resin to auxiliary epoxy resin of about 10:90 to about 90:10,
wherein the functionalized oligomer epoxy resin is obtained by reacting (i) a glycidyl ether component comprising at least two epoxide groups and (ii) a bio-based component comprising a fatty acid and a rosin acid at a molar ratio of the glycidyl ether component to the bio-based component of about 0.5:1 to about 1.5:1, thereby forming the functionalized oligomer epoxy resin.

2. The curable composition according to claim 1, wherein:
the fatty acid is derived from at least one soybean oil, canola oil, tall oil, safflower oil, linseed oil, castor oil, corn oil, sunflower oil, olive oil, sesame oil, cottonseed oil, palm-based oils, rapeseed oil, tung oil, peanut oil, jatropha oil, or a combination thereof;
the rosin acid comprises at least one gum rosin acid, wood rosin acid, tall oil rosin acid, or a combination thereof;
the functionalized epoxy resin has an acid number of less than or equal to about 5 milligrams of KOH per gram according to ASTM D664;
the functionalized epoxy resin has an epoxide equivalent weight of about 200 to about 800 grams per equivalent; or
a combination thereof.

3. The curable composition according to claim 1, wherein the glycidyl ether component comprises a bisphenol epoxy resin, a novolac epoxy resin, a diglycidyl ether, triglycidyl ether, tetraglycidyl ether, or a combination thereof.

4. The curable composition according to claim 3, wherein the bisphenol epoxy resin comprises bisphenol A epoxy resin, bisphenol F epoxy resin, or a combination thereof.

5. The curable composition according to claim 3, wherein the diglycidyl ether comprises a diglycidyl ether of neopentyl glycol, a diglycidyl ether of 1,4-butanediol, or diglycidyl ether of resorcinol; the triglycidyl ether comprises trimethylolpropane triglycidyl ether; and the tetraglycidyl ether comprises pentaerythritol tetraglycidyl ether.

6. The curable composition according to claim 3, wherein the novolac epoxy resin comprises epoxy phenol novolac, epoxy cresol novolac, or a combination thereof, and wherein the novolac epoxy resin has an epoxy functionality of 3-6.

7. The curable composition according to claim 1, wherein the bio-based component further comprises fatty acid derivatives, rosin acid derivatives, or a combination thereof.

8. The curable composition according to claim 7, wherein the fatty acid derivatives comprise dimer fatty acids, acrylic acid modified fatty acids, maleic anhydride modified fatty acids, or a combination thereof.

9. The curable composition according to claim 7, wherein the rosin acid derivatives comprise hydrogenated rosins, disproportionated rosins, maleic anhydride modified rosins, fumaric acid modified rosins, or a combination thereof.

10. The curable composition according to claim 1, wherein the bio-based component comprises
1-99 wt % of fatty acids; and
1-99 wt % of rosin acids.

11. The curable composition according to claim 1, wherein the molar ratio of the glycidyl ether component to the bio-based component is about 0.9:1 to about 1.1:1.

12. The curable composition according to claim 1, wherein the glycidyl ether component is bisphenol A epoxy resin, and the bio-based component is a distilled tall oil comprising up to about 50 wt % rosin acids, based on the total weight of the distilled tall oil.

13. The curable composition according to claim 1, wherein the glycidyl ether component is a bisphenol A epoxy resin and a novolac epoxy resin, and the bio-based component is a distilled tall oil comprising up to about 50 wt % rosin acids, based on the total weight of the distilled tall oil.

14. The curable composition according to claim 1, wherein the glycidyl ether component is triglycidyl ether and novolac epoxy resin, and the bio-based component is a distilled tall oil comprising up to about 50 wt % rosin acids, based on the total weight of distilled tall oil.

15. The curable composition according to claim 1, wherein the glycidyl ether component is trimethylolpropane triglycidyl ether, and bio-based component is a distilled tall oil comprising from about 50 wt % to about 70 wt % rosin acid, based on the total weight of the bio-based component.

16. The curable composition of claim 1, wherein the ratio of functionalized oligomer epoxy resin to auxiliary epoxy resin is about 25:75 to about 75:25.

17. The curable composition of claim 1, wherein
the glycidyl ether component is bisphenol A epoxy resin, and the bio-based component is a distilled tall oil comprising up to about 50 wt % rosin acids; or
the glycidyl ether component is a mixture of bisphenol A epoxy resin and a novolac epoxy resin, and the bio-based component is a distilled tall oil comprising up to about 50 wt % rosin acids; or
the glycidyl ether component is a mixture of triglycidyl ether and novolac epoxy resin, and the bio-based component is a distilled tall oil comprising up to about 50 wt % rosin acids, each based on the total weight of the bio-based component.

18. A method of preparing the curable composition of claim 1, the method comprising the steps of
a. admixing (i) the glycidyl ether component comprising at least two epoxide groups and (ii) the bio-based component comprising the fatty acid and the rosin acid to form a reaction mixture;
b. heating the reaction mixture;
c. adding a catalyst to the reaction mixture;
d. allowing the reaction to proceed until the reaction mixture has an acid number of less than or equal to about 1 mg KOH/g according to ASTM D664;
e. adding the reaction mixture from step (d) to an auxiliary epoxy resin to form a mixture;
f. adding a curing agent to the mixture from step (e).

19. The curable composition of claim 1, wherein the functionalized oligomer epoxy resin is a liquid.

20. The curable composition of claim 1, wherein the ratio of functionalized oligomer epoxy resin to auxiliary epoxy resin is about 25:75 to about 75:25, or about 50:50.

* * * * *